Figure 1:
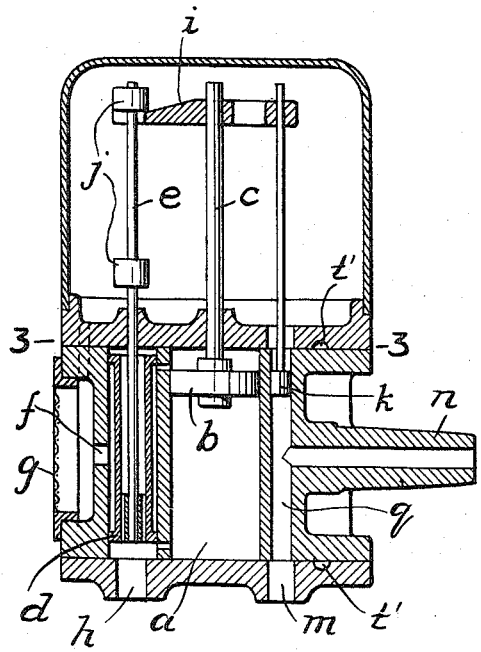

Sept. 26, 1933.   H. O. LINDGREN   1,928,430
FLUID BRAKING MECHANISM
Filed Aug. 9, 1929   2 Sheets-Sheet 1

INVENTOR
Hans Olof Lindgren
BY
ATTORNEYS.

WITNESS:

Sept. 26, 1933. H. O. LINDGREN 1,928,430
FLUID BRAKING MECHANISM
Filed Aug. 9, 1929 2 Sheets-Sheet 2

WITNESS:
Rob' R Mitchel

INVENTOR
Hans Olaf Lindgren
BY
Burnett Hardury
ATTORNEYS

Patented Sept. 26, 1933

1,928,430

UNITED STATES PATENT OFFICE 1,928,430

FLUID BRAKING MECHANISM

Hans Olof Lindgren, Stockholm, Sweden, assignor to The De Laval Separator Company, New York, N. Y., a corporation of New Jersey Application August 9, 1929, Serial No. 384,589, and in Sweden, September 6, 1928

7 Claims. (Cl. 188—97)

For producing the variations in air-pressure by means of which the milking operation is carried out in milking machines operated by a vacuum, so-called pulsators are used. These are of very different types. A common type is one in which a piston, membrane or the like moves to and fro under the influence of a vacuum and thereby alternately opens and closes pipe lines and channels for full atmospheric pressure and vacuum. The speed of the pulsation is regulated by greater or smaller throttling of the channels through which the air flows.

An objection to this type of apparatus is that the speed of pulsation cannot be kept constant, which is, however, necessary for a good milking effect. The air passing through the pulsator may, even if it has been led through a strainer, contain small particles of dust and the like, which partly clog the fine passages through which the air streams, and cause a change in the pulsation speed.

In an application filed by E. A. Forsberg March 7, 1928, Serial No. 259,875, is set forth apparatus of the type specified, but improved so as to largely overcome the defect specified, as well as other defects characterizing pulsators of this type. The forsberg apparatus comprises a pneumatically operating working member, a valve adapted to control the pneumatic operation of said member, means controlled by said member to actuate the valve, a conduit through which pneumatic pulsations are transmissible, a regulating valve, controlled by said member, adapted to effect pneumatic pulsations in said conduit, and a fluid braking device connected with and operable by said member and adapted to oppose to the movement of said member a resistance that is relatively small near, and relatively great between, the ends of its movements. The fluid braking device may comprise a pair of cylinders on opposite sides of the working piston, pistons in the cylinders connected and movable with the working member, channels for flow of air between opposite sides of the pistons of the braking device, and a throttle screw or other suitable device for throttling the flow of air through said channels and thereby regulating the speed of the pulsation.

The present invention is an improvement on a pulsator of the Forsberg type. It has the advantage that the pulsator works at practically constant speed, even if some clogging should occur in the air flow channels of the braking device. It has also the advantage of affording dependable means for very accurately regulating the speed of the pulsator. The invention comprises the substitution for the channels regulating the speed of the pulsation, of a number of expansion chambers, connected in series by ports or passages having areas considerably smaller than the areas of the expansion chamber. By this means the speed can be regulated by using ports or passages of areas so comparatively large that no considerable relative reduction of the same would be caused by the deposition of a small number of foreign particles.

The embodiments of this invention illustrated in the drawings show a pulsator of the Forsberg type, but modified to embody my invention in two of many different possible forms.

Figure 2:
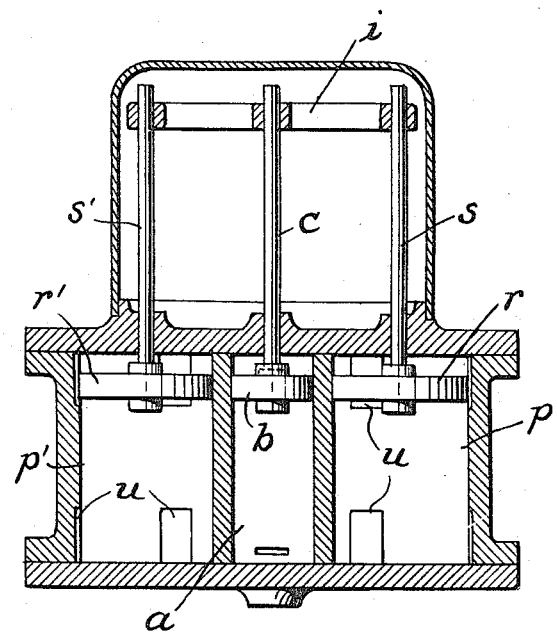
Figure 3:
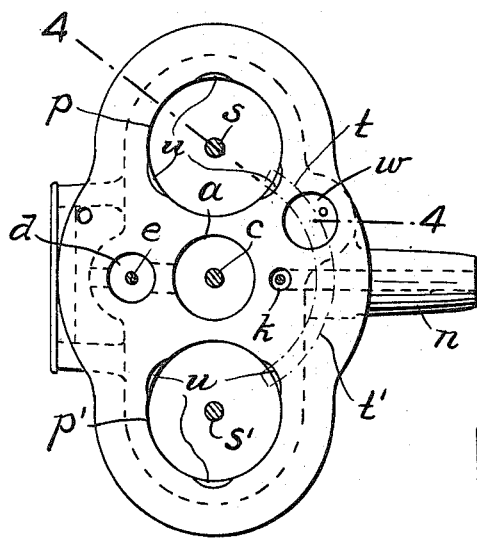
Figure 4:
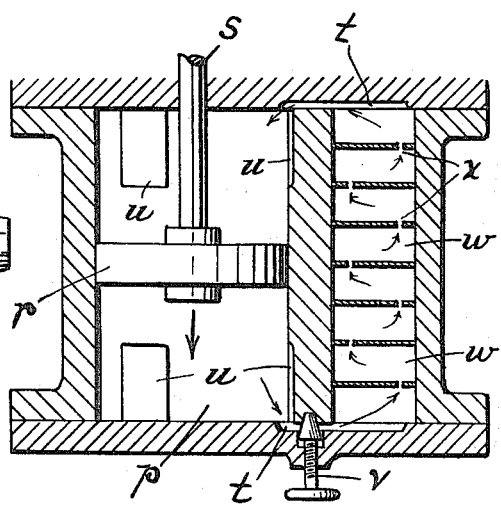
Figure 5:
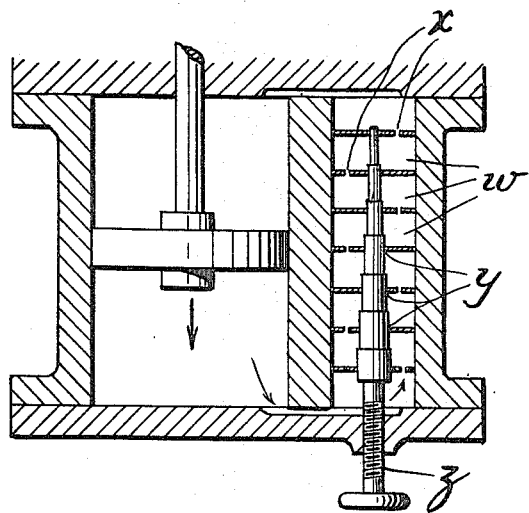
Figure 7:
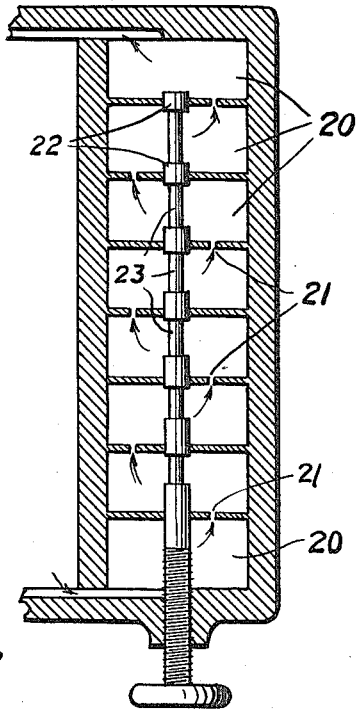
Figure 6:
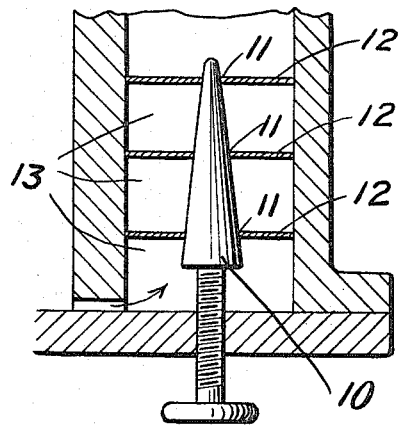

Fig. 1 is a vertical sectional view of the pulsator. Fig. 2 is a vertical sectional view taken at right angles to Fig. 1. Fig. 3 is a horizontal section through the pulsator on line 3—3 of Fig. 1. Fig. 4 is an enlarged vertical section through one of the fluid braking cylinders and the expansion chambers connecting the opposite ends of the cylinders, on line 4—4 of Fig. 3. Fig. 5 is a view, similar to Fig. 4, of a modification. Fig. 6 is a view, similar to Figs. 4 and 5, of another modification. Fig. 7 is a view, similar to Figs. 4, 5 and 6, of still another modification.

A piston $b$ is reciprocable in a cylinder $a$. The cylinder is provided with a slide valve $d$ which is connected with the valve rod $e$. The space around the slide valve is, by means of a hole $f$ and a strainer $g$, connected with the outer atmosphere. The spaces at the ends of the slide valve connect with a vacuum through the passage $h$. The piston rod $c$ is provided with a cross-piece $i$ which, as the piston approaches its end positions, contacts with two collars $j$ on the valve rod $e$. By this means the slide valve is reversed and a reciprocatory movement of the piston is obtained. Of course, also other types of devices for the reversal of the slide valve can be used, but the one described is preferred because of its simplicity and reliability.

The piston rod $c$ is also connected with another piston or valve $k$ which regulates the variations in the air pressure at the teat cups or milking organs proper. Valve $k$ may be arranged in different ways according to the construction of the milking organs. In the embodiment illustrated in the drawings it is presumed that the milking organs are so constructed as to be influenced by full atmospheric pressure and vacuum alternately for equally long periods. The regulating valve consists then simply of the piston $k$, which moves to and fro in the cylinder $q$. At one end of the piston there is full atmospheric pressure, whereas at the other end there is a vacuum, conducted through the passage $m$. From a midway point in cylinder $q$ extends a nipple $n$, which is connected with the milking organ by means of a hose (not shown). When the piston $k$ is at one side of the nipple $n$, there is full atmospheric pressure in the latter, and when the piston is on the other side a vacuum prevails.

To regulate the movement of the piston there are two brake-cylinders $p$, $p^1$, in which the pistons $r$, $r^1$, move, the latter being connected with the cross piece $i$ by means of the piston rods $s$, $s^1$. From one end of the cylinders to the other there are overflow channels $t$, $t^1$, suitably connected with each other to constitute one system, so that the same pressure always prevails in the two cylinders. The cylinders $p$, $p'$, are at their ends provided with recesses $u$ in the wall, so that, when a piston nears the end of its srtoke a free passage is opened between the two sides of the piston.

Between the two ends of the brake cylinders, $p$ and $p'$, is a series of expansion chambers $w$, $w$, etc., formed by partitions which may be sweated or brazed in place or otherwise mechanically united to or made integral with the body of the frame in which the cylinders are formed. Openings $x$ connect adjacent expansion chambers. At a suitable place, for instance in the channel between the brake cylinder and the first expansion chamber $w$, a regulating screw or valve $v$ is inserted. By this arrangement there are obtained successive expansions with as many drops of pressure as there are expansion chambers. The arrangement also allows the connecting ports or passages $x$ between the expansion chambers $w$ and also the opening around the regulating screw $v$ to be given considerably greater dimensions than if only an overflow opening arranged around the regulating screw $v$ were used. To obtain perfect balanced action on the two braking pistons $r$ and $r'$, the valve $v$ should be at the junction of the passages $t$ and $t'$, but so large a proportion of the throttling is produced by the orifices $x$ that it is permissible to have the valve $v$ control one piston only. In the construction shown the regulating screw $v$ is employed only as a precision regulating device, since it is possible, by giving the ports $x$ suitable dimensions, to insure that the pulsator shall work with the intended speed.

Fig. 5 shows another embodiment of the invention in which, as in Fig. 4, the expansion chambers $w$ are connected by openings $x$. The partitions between the expansion chambers are, however, also provided with a number of circular holes $y$, which are centrally arranged and have different diameters. As shown, the diameters of holes $y$ decrease progressively from the bottom to the top. A regulating screw $z$ is composed of stepped or shouldered valve sections of progressively decreasing diameters from bottom to top, the diameters of the sections of the screw corresponding to the diameters of the respective holes $y$. When the screw is in its upper position, all the openings $y$ are closed. The length of the sections relative to the height of the expansion chambers is such that the screw can be lowered just sufficiently to open the top hole $y$ without opening the remaining holes. By moving down the screw a slight further distance, the upper two holes $y$ may be opened. So, by moving the screw to progressively lower positions additional holes $y$ will be opened. When the screw is moved to its lowest position, all the holes $y$ will be opened.

When all the holes $y$ are closed, the air that streams from one end to the brake cylinder to the other is forced to flow through the comparatively restricted openings $x$ in all the expansion chambers. That is, all the expansion chambers are performing their full function. This, at the given fall of pressure, requires a certain time for the overflow of the air. If the upper opening $y$ is liberated the upper expansion chamber will be in part functionless, since the air streams into it from the expansion chamber beneath it (or vice versa) comparatively freely. Thereby the braking action will be diminished and the speed of the pulsator will be increased. As the openings $y$ are opened one by one, successive expansion chambers are rendered in part functionless, thus opposing progressively less resistance to the overflow of air.

Another modification is shown in Fig. 6. A conical screw 10 projects through holes 11 in a series of diaphragms 12 that form a series of expansion chambers 13. When the screw 10 is in its upper position, all the holes 11 are closed. Moving down the screw opens all the openings 11 proportionately to the extent to which the screw is moved down.

Another modification is shown in Fig. 7. As in Figs. 4 and 5, the expansion chambers 20 are connected by a series of openings 21. The partitions forming the expansion chambers are provided with circular holes located centrally of the partitions and may be of different diameters or of the same diameter. A regulating screw, composed of a series of valve sections 22 connected by necks 23, extends through the holes in the partitions. The valve sections 22 increase in length progressively from one end to the other end of the screw. When the screw is in its upper position all the central holes in the partitions are closed. As the screw is moved to successively lower positions, the valve sections 22 successively open their respective holes. Thereby the braking action will be progressively reduced and the speed of the pulsator progressively increased.

The various embodiments of the invention shown must be considered as merely illustrative, as other embodiments may be devised by the skilled mechanic. It should also be understood that the invention is not limited in its application to the construction shown in Figs. 1, 2 and 3, wherein the air in the brake system is not in communication with the air in the channels pneumatically connected with the milking organs, and one and the same quantity of air always circulates in the brake cylinders $p$, $p'$. In such a construction, the danger of clogging the air flow channel is much reduced, especially if the cylinders are well cleaned before starting the operation. It is obvious, therefore, that my invention is of special utility to prevent clogging when applied to pulsators of other constructions that do not contain provisions for effectively excluding the admission to the air flow channels of foreign particles. Even, however, when applied to the pulsator shown, as well as when applied to other pulsators of the same generic class, my invention has the pronounced advantage of affording a reliable means for very accurately regulating the speed of the pulsation.

While the invention has been described as applied to a milking machine, and is of special utility in such application, it is capable of being adapted to other machines wherein fluid braking is desired or required.

Having now fully described my invention, what I claim and desire to protect by Letters Patent is:

1. In a milking machine comprising a working member adapted to control the production of pneumatic pulsations: a fluid braking device connected with and operable by said working member and comprising means forming spaces adapted to be under different air pressures and a series of expansion chambers through which air is adapted to flow from the high pressure space to the low pressure space.

2. In a milking machine comprising a working member adapted to control the production of pneumatic pulsations: a fluid braking device connected with and operable by said working member and comprising means forming spaces adapted to be under different air pressures and a series of chambers between two spaces, there being ports connecting adjacent chambers to allow flow of air at predetermined speed from one chamber to another with progressive expansion of the air in the successive chambers.

3. In a milking machine comprising a working member adapted to control the production of pneumatic pulsations: a fluid braking device connected with and operable by said working member and comprising means forming spaces adapted to be under different air pressures and a series of expansion chambers through which air is adapted to flow from the high pressure space to the low pressure space, and means to regulate the rate of flow of the air from one expansion chamber to another.

4. In a milking machine comprising a working member adapted to control the production of pneumatic pulsations: a fluid braking device connected with and operable by said working member and comprising means forming spaces adapted to be under different air pressures and a series of expansion chambers between the two spaces, there being holes for free flow of air from one chamber to another, and means adapted to open or close said holes successively.

5. In a milking machine comprising a working member adapted to control the production of pneumatic pulsations: a fluid braking device connected with and operable by said working member and comprising means forming spaces adapted to be under different air pressures and a series of expansion chambers between the two spaces, there being two sets of orifices affording communication from chamber to chamber, and means to open and close one set of orifices.

6. In a milking machine comprising a working member adapted to control the production of pneumatic pulsations: a fluid braking device connected with and operable by said working member and comprising means forming spaces adapted to be under different air pressures and a series of expansion chambers between the two spaces, there being holes for free flow of air from one chamber to another, and means adapted to open or close said holes, there being other and more restricted openings between adjacent expansion chambers to allow limited flow of air when said holes are closed.

7. In a milking machine comprising a working member adapted to control the production of pneumatic pulsations: a fluid braking device connected with and operable by said working member and comprising means forming spaces adapted to be under different air passages and a series of expansion chambers through which air is adapted to flow from the high pressure space to the low pressure space with progressive expansion of the air in successive chambers, and means to regulably vary the drop in pressure from one chamber to another.

HANS OLOF LINDGREN.